United States Patent [19]
Iguchi et al.

[11] 3,990,686
[45] Nov. 9, 1976

[54] FURNACE FOR PRODUCING STEEL FROM SCRAP STEEL AND THE LIKE

[75] Inventors: Mitsuya Iguchi; Masahiro Kuwashiro, both of Himeji, Japan

[73] Assignee: Toshin Seiko Kabushiki Kaisha, Tokyo, Japan

[22] Filed: Feb. 14, 1975

[21] Appl. No.: 550,133

[52] U.S. Cl. ............................... 266/241; 266/280
[51] Int. Cl.² ................................................. C21C 5/52
[58] Field of Search ............... 13/35; 110/1 R, 1 A; 266/32, 33 R, 33 S, 34 R, 35, 43, 200, 241, 243, 280

[56] References Cited
UNITED STATES PATENTS

| | | | |
|---|---|---|---|
| 750,171 | 1/1904 | Cowles | 13/32 |
| 1,439,410 | 12/1922 | Gray | 266/43 |
| 1,569,197 | 1/1926 | MacCallum | 110/1 A |
| 3,079,266 | 2/1963 | Galy et al. | 106/56 |
| 3,190,626 | 6/1965 | Schwabe et al. | 266/43 |
| 3,283,040 | 11/1966 | Stover | 106/56 |
| 3,505,090 | 4/1970 | Pinchbeck | 106/56 |
| 3,794,307 | 2/1974 | Seo | 266/32 |
| 3,829,595 | 8/1974 | Nanjyo et al. | 13/32 |
| 3,849,587 | 11/1974 | Hatch et al. | 13/32 |

FOREIGN PATENTS OR APPLICATIONS

| | | | |
|---|---|---|---|
| 1,514,515 | 2/1968 | France | 13/35 |
| 1,296,069 | 5/1969 | Germany | 106/56 |

*Primary Examiner*—Roy Lake
*Assistant Examiner*—Paul A. Bell
*Attorney, Agent, or Firm*—Haseltine, Lake & Waters

[57] ABSTRACT

A furnace for producing steel from steel scrap and the like is constructed in a manner such that the interior surface of the furnace wall upward from a level spaced apart by a predetermined distance from the surface of a slag layer formed on the molten steel is lined with carbonaceous bricks, and water-cooling means are provided in this part of the furnace wall.

1 Claim, 1 Drawing Figure

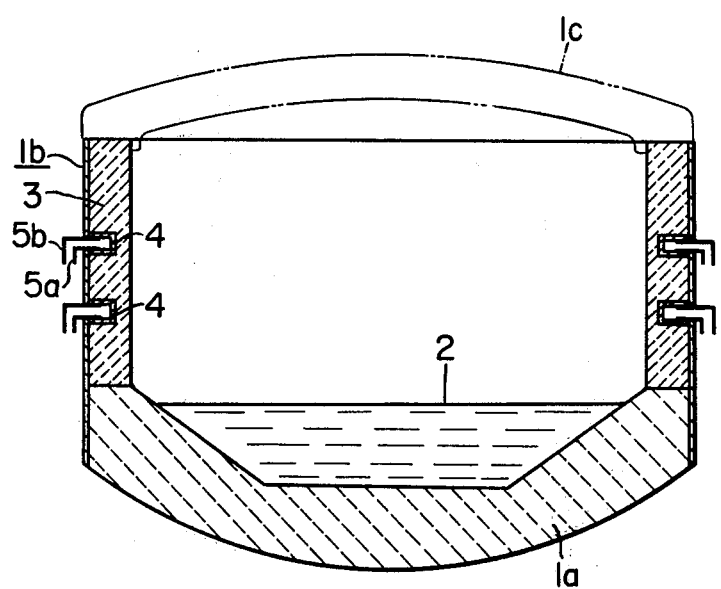

FURNACE FOR PRODUCING STEEL FROM SCRAP STEEL AND THE LIKE

BACKGROUND OF THE INVENTION

This invention relates generally to smelting furnaces and to the production of steels, and more particularly to a furnace for producing steels with steel scrap and the like as a raw material.

It is well known that the furnace wall of a furnace for melting metal must have excellent thermal properties such as heat resistance, heat insulation, high strength at high temperature, and erosion resistance similarly as in the case of ordinary heating furnaces. However, in a steel producing furnace, particularly that wherein steel is produced with steel scrap as a raw material, a high concentration of thermal energy is applied to the furnace thereby to elevate the working efficiency, and for this reason, the temperature of the interior of the furnace rises to a very high value.

Consequently, the firebricks lining the furnace tend to be damaged severely, and hence frequent maintenance (or periodical repairs) and replacement of the firebricks are required. Furthermore, even during operation, spalling and erosion caused by the spattering of oxidized metal have frequently and unavoidably made it necessary to interrupt the operation of the furnace at time, other than those for periodical maintenance. Frequent interruptions of furnace operation reduces the steel quantity thereby produced, and hence elevates the production cost.

In order to avoid the above described difficulties in the known furnaces, use is made of improved bricks such as basic high burned bricks and the like, which are baked at a higher temperature than the ordinary firebricks. However, so far as we are aware, none of these firebricks could satisfactorily overcome the aforementioned difficulties of the conventional furnaces.

It is also known that so-called carbonaceous bricks have a softening temperature in a range of from 1,500° C to 1,900° C, and the heat resistance thereof is far superior to those of any of the conventional firebricks. Furthermore, the real density of a carbonaceous brick is approximately 3,000 kg/m$^3$, which is much higher than those of other bricks, and the specific heat thereof is 0.2 Kcal/kg°C. A carbonaceous brick also has high strength at high temperatures, and the resistance thereof to spalling is much higher than those of the ordinary firebricks.

However, a carbonaceous brick has drawbacks such as high susceptivity to oxidation, and low resistance to slag attack at high temperatures. In addition, the thermal conductivity of the carbonaceous brick is almost ten-times higher than that of the ordinary firebricks. These disadvantageous properties of carbonaceous bricks are so significant that it has been considered heretofore that carbonaceous bricks are not suitable for furnace walls despite the aforementioned advantageous features.

SUMMARY OF THE INVENTION

An important feature of the present invention is the provision of a furnace for producing steels wherein the aforementioned carbonaceous bricks are used in major part of the furnace wall, whereby the heat resistance, the strength at high temperatures, and the anti-spalling nature of the furnace is substantially improved.

Another feature of the invention is the provision of a furnace for producing steels wherein a part of the furnace wall, whose lower edge is spaced upward from the upper surface of the slag layer by a predetermined distance, is made of carbonaecous bricks, and water-cooling means are provided in this part of the furnace wall, so that while the advantageous properties of the carbonaceous bricks are fully utilized, the effects of the undesirable properties of the same bricks, such as the susceptibility to oxidation, low slag resistance, and tendency to be eroded by the spattered oxidized metal, can be substantialy reduced.

Still another feature of the invention is the provision of a steel producing furnace wherein the aforementioned water-cooling means is provided in the form of cooling-water boxes inserted in the above described part of the furnace wall, whereby the construction of the furnace and the handling of the water-cooling pipe lines can be greatly simplified.

An additional feature of the invention is the provision of a furnace for producing steels wherein a plurality of the cooling-water boxes are provided in the furnace wall, whereby the replacement thereof in the event of leakage trouble can be greatly facilitated.

A furnace for producing steel according to the present invention comprises a bottom portion, a furnace wall erected around said bottom portion for defining a part containing molten steel, a carbonaceous brick lining provided on a wall part of the interior surface of said furnace wall in such a manner that the lower edge of said wall part is spaced apart upward by a predetermined distance from the surface of a slag layer formed on the surface of the molten steel, and means for water-cooling said part of the furnace wall-lined with carbonaceous bricks.

The nature, principle, the utility, and further features of the invention will be more fully understood from the following detailed description of the invention when read in conjunction with the accompanying single drawing, which is an elevation, in vertical section, showing a preferred embodiment of the invention.

BRIEF DECRIPTION OF THE DRAWING

The single FIGURE of the accompanying drawing is an elevation in vertical section schematically showing a furnace according to the present invention.

DETAILED DESCRIPTION OF THE INVENTION

Referring to the accompanying drawing, there is indicated a furnace 1 comprising a dish-shaped bottom portion 1a, a furnace wall 1b erected on and around the periphery of the bottom portion 1a, and a roof portion 1c provided to cover the upper end of the furnace wall 1b. Molten metal produced in the furnace from a starting material such as scrap steel is collected in the lower part of the furnace inclusive of the bottom portion 1a and a lower part of the furnace wall 1b. Ordinarily, the surface of the molten metal is covered by a slag layer collected on the surface of the molten metal.

According to the present invention the inner surface of a part, designated at 3, of the furnace wall 1b, ranging from approximately 100mm above the surface 2 of the slag layer to the upper end of the furnace wall 1b is lined with carbonaceous bricks. Also according to the invention, a required number (two in the illustrated example) of water-cooling boxes 4 are provided in this part 3 of the furnace wall 1b in such a manner that the lowest box is located at a position separated upwardly from the surface 2 of the slag layer by a distance ranging from 300mm to 500mm. The second lowest box is provided at a position upwardly separated from the lowest box by about 400mm, and succeeding water-cooling boxes, if any, are provided in the same manner with a distance of approximately 400mm maintained therebetween.

Each of the boxes 4 may be of a rectangular cross-section which, when the thickness of the furnace wall inclusive of the carbonaceous brick lining is assumed to be approximately 350mm, has a thickness of about 200mm and a height of about 130mm. Each of the water-cooling boxes 4 may be of a continuous construction of an annular shape around the furnace wall. Alternatively, each of the thus annularly formed water-cooling boxes 4 may be divided along its circumference into a plurality of blocks (three blocks in this example). In either of the cases, each of the annular boxes or each of the blocks of the boxes, are connected with both a water supplying pipe line 5a and a water discharging pipe line 5b, so that cooling water can be circulated therethrough through these pipe lines 5a and 5b. Since the water-cooling boxes 4 are thus divided, the maintenance and replacement of damaged parts of the cooling system can be substantially facilitated.

Although it has been described that two of the water-cooling boxes each divided into three blocks are provided in the described example, three or four water-cooling boxes may be arranged vertically at a predetermined interval, and each of the boxes may be divided into from 2 to 4 blocks depending on the size of the furnace.

Carbonaceous bricks used for lining the aforementioned part 3 of the furnace wall 1b are of a carbon content of more than 99%, a porosity of from 25 to 30%, a bulk density of from 1.5 to 1.6 kg/l, and a refractoriness of about 3,400° C.

Since the composition of the furnace according to the present invention is as described above, the upper part 3 of the furnace wall can be cooled effectively because of the aforementioned high thermal conductivity of the carbonaceous bricks when cooling water is circulated through the water-cooling boxes via the water supplying pipe line 5a and the water discharging pipe line 5b. Thus, excessive high temperature of the carbonaceous bricks, which tends to cause erosion of the bricks at the time when oxidized metal such as iron oxide is spattered onto the surfaces of the bricks, can be avoided, and the advantageous features of the carbonaceous bricks such as the high heat resistance, high strength at high temperatures, and high spalling resistance can be fully utilized at the operating temperature of the furnace.

As a result of our experiments, it has been found that the furnace of this invention can withstand more than 250 heats of operations without any repair at a high productivity of 15,000 tons of steel in 20 days, while the conventional furnaces have become useless after about 50 heats of operations producing about 10,000 tons of steel in 20 days with the furace being repaired during these operations.

Furthermore, it was made apparent that the unit consumption of the bricks (quantity of bricks used for building and repairing furnace versus the quantity of steel produced during the life time of the furnace) can be reduced to as low as 1.7kg per one ton of the product, which is less tha one half of the quantity required for the conventional furnaces.

What we claim is:

1. A furnace for producing steel, comprising a bottom portion, a furnace wall set up around said bottom portion for defining a part containing molten steel, a carbonaceous brick lining having a carbon content of more than 99%, a porosity in a range of from 25 to 30%, a bulk density in a range of from 1.5 to 1.6 kg/l, and a refractoriness of 3,400° C is provided on a wall part of the interior surface of said furnace wall in such a manner that the lower edge of said wall part is spaced apart upward by a predetermined distance from the surface of a slag layer formed on the surface of the molten steel, a plurality of water-cooling boxes of annular configuration distributed in said part of the furnace wall in a vertically spaced apart relationship and buried in said part of the furnace wall at a predetermined depth measured outwardly from the interior surface thereof, water-supplying and water-exhausting pipe lines connected to each water-cooling box so that cooling water can be circulated therethrough.

* * * * *